Patented Mar. 23, 1948

2,438,124

UNITED STATES PATENT OFFICE 2,438,124

PRODUCTION OF 1,2-DISUBSTITUTED 3-CYANOGUANIDINES

Hans Z. Lecher, Plainfield, and Robert P. Parker and Robert S. Long, Somerville, N. J., assignors to American Cyanamid Company, New York, N. Y., a corporation of Maine No Drawing. Application September 22, 1945, Serial No. 618,068

5 Claims. (Cl. 260—551)

This invention relates to guanidine derivatives. More specifically, it relates to a new process for preparing 1,2-dihydrocarbon-substituted 3-cyanoguanidines, and also to the 3-cyanoguanidines of this series which are new compounds and contain at least one aliphatic hydrocarbon radical.

Only a few 1,2-diaryl-3-cyanoguanidines are known, and these are prepared by a complicated method.

According to the present invention, 1,2-disubstituted 3-cyanoguanidines are prepared by reacting a correspondingly disubstituted carbodiimide with cyanamide. The general reaction is shown in Equation 1,

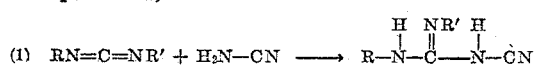

where R and R' stand for hydrocarbon radicals.

Some reactions of this type proceed without catalyst, others require an alkaline catalyst or proceed in alkaline media.

The carbodiimides may be prepared in the customary manner by reacting dethionating agents upon the corresponding 1,3-disubstituted thiourea. It is not necessary to isolate these carbodiimides, but the solution as obtained in the dethionation of the corresponding thiourea may be used directly in the reaction with cyanamide. This is important since some carbodiimides, particularly the lower aliphatic members of this series such as dimethyl carbodiimide and diethyl carbodiimide, are rather unstable and may polymerize when an attempt is made to isolate them from the solution in which they are prepared.

Furthermore, it is possible to combine the two steps, that is to say, the dethionation of the thiourea and the reaction of the resulting carbodiimide with cyanamide. This reaction is shown in Equation 2,

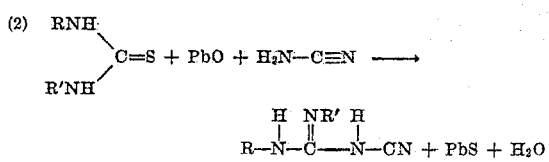

where R and R' have the same meaning as above. PbO is used here only as an example, and other metal oxides, such as those of mercury and silver, may be used.

A third very convenient and, as a matter of fact, the preferred modification of the invention, consists in reacting a 1,3-disubstituted thiourea with a cyanamide salt of a metal having great affinity for sulfur. This modification may be expressed in Equation 3.

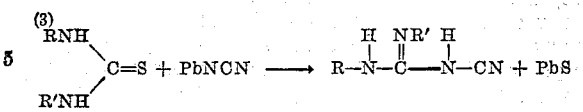

where R and R' have the same meaning as above. PbNCN is used here only as an example, and other metal salts of cyanamide, such as those of mercury and silver, may be used.

It is believed that in the latter two methods the carbodiimide is first formed, and that it then reacts with the cyanamide to give the 1,2-disubstituted 3-cyanoguanidines as described in Equation 1.

The substituent hydrocarbon radicals, R and R', of the thioureas, carbodiimides, and 3-cyanoguanidines may be alkyl, aryl, alkaryl, aralkyl, or cycloalkyl, and may be saturated or unsaturated. Examples of such radicals are methyl, ethyl, propyl, isobutyl, butyl, octyl, dodecyl, octadecyl, allyl, phenyl, tolyl, xylyl, naphthyl, biphenylyl, benzyl, cyclohexyl, and the like. The carbodiimides and the thiourea may be substituted by the same or different hydrocarbon radicals. Examples of these compounds are s-dimethylthiourea, 1,3-methylethylthiourea, s-diethylthiourea, s-dipropylthiourea, s-dibutylthiourea, s-didodecylthiourea, s-dioctadecylthiourea, s-diphenylthiourea, s-di-o-tolylthiourea, s-di-pxylylthiourea, 1,3-methylphenylthiourea, 1,3-phenyl - o - tolylthiourea, 1,3-phenyldodecylthiourea, s-dibenzylthiourea, s-dicyclohexylthiourea, and the carbodiimides derived from these thioureas.

The dethionating agents used comprise the oxides of heavy metals chosen from the group consisting of lead, silver, and mercury. These metals have a particularly great affinity for sulfur, as evidenced by the fact that they form insoluble sulfides which are not decomposed by aqueous acids.

As mentioned above, it is advantageous to use cyanamides salts of these dethionating metals. The use of lead cyanamide is particularly advantageous.

The reaction is carried out in the presence of an organic solvent or diluent essentially inert under the reaction conditions, and it is an advantage of the present invention that a variety of diluents or solvents may be employed, such as, for example: ethers, alcohols, ketones, aromatic hydrocarbons, and the like.

The temperature for suitable reaction is varied according to the specific thiourea or carbodiimide used. Thus, in the lower aliphatic substituted thiourea and carbodiimide series the reaction occurs readily at room temperature, while thioureas and carbodiimides containing higher aliphatic radicals require the temperature of higher boiling solvent, such as butyl alcohol or toluene.

It is somewhat unexpected that alcohols can be used as solvents in this reaction because it is known that they have been reacted with some carbodiimides to form isoureas. In this invention the carbodiimides react preferentially with the cyanamide.

Upon completion of reaction the metal sulfide, formed in the reaction, is removed, usually by filtration. In some cases the 1,2-disubstituted 3-cyanoguanidine compound may be isolated by cooling the filtrate, whereupon the 1,2-disubstituted 3-cyanoguanidine crystallizes and may be isolated by filtering. In other cases, dilution of the filtrate with water serves to precipitate the 1,2-disubstituted 3-cyanoguanidine which may be recovered by filtration. In other preparations, these 3-cyanoguanidines may possess a high solubility, and from these, the product may be recovered by removing the solvent through evaporation.

The main advantage of the new process is to make a large number of 1,2-disubstituted 3-cyanoguanidine derivatives easily accessible. Since 1,3-disubstituted thioureas are easily obtained from the corresponding primary amines and carbon bisulfide or substituted isothiocyanate and amines, the process uses inexpensive and readily available raw materials. Its operation is simple and the yields are, in most cases, very good.

The 1,2-disubstituted 3-cyanoguanidines of this invention, where at least one of the substituents is an aliphatic radical, are new compounds.

The 1,2-disubstituted 3-cyanoguanidines of this invention are valuable organic intermediates whose principal uses are in the fields of synthetic resins, pharmaceuticals, textile assistants, and dyestuff assistants.

The following specific examples will serve to describe in greater detail the process of the present invention. It will be understood that the examples are typical of the present invention, but are not intended to limit it in any manner.

EXAMPLE 1

1,2-diethyl-3-cyanoguanidine

A

| Reagents | Molar Ratio |
| --- | --- |
| s-Diethylthiourea | 1.00 |
| Diethyl ether | 19.50 |
| Sodium sulfate, anhydrous | 1.55 |
| Mercuric oxide | 2.00 |
| Cyanamide | 1.05 |
| Diethyl ether | 3.90 |

A solution of symmetrical diethylthiourea in diethyl ether is stirred and treated with anhydrous sodium sulfate and mercuric oxide. While this mixture is stirred, a solution of cyanamide in diethyl ether is carefully added. The reaction mixture is stirred at room temperature until a small filtered portion is not discolored when treated with fresh mercuric oxide. The black mercuric sulfide is separated by filtration and the product is recovered by evaporation. Crude 1,2-diethyl-3-cyanoguanidine is purified by crystallization from water, and the pure compound melts at 129°–129.2° C.

B

| Reagents | Molar Ratio |
| --- | --- |
| Lead cyanamide | 1.13 |
| s-Diethylthiourea | 1.00 |
| Ethanol | 21.20 |

The lead cyanamide and the alcoholic solution of symmetrical diethylthiourea are stirred at refluxing temperature until a clarified portion of the solution shows no discoloration when treated with yellow mercuric oxide. The black lead sulfide is separated by filtration, and the 1,2-diethyl-3-cyanoguanidine is recovered by evaporation of the filtrate. This crude product is also purified by recrystallization from water, and has the melting point reported in Example 1A.

C

| Reagents | Molar Ratio |
| --- | --- |
| s-Diethylthiourea | 1.00 |
| Sodium sulfate, anhydrous | 1.56 |
| Mercuric oxide | 2.00 |
| Diethyl ether | 19.40 |
| Cyanamide | 1.00 |
| Sodium methylate | 0.037 |
| Methanol | 0.50 |

A mixture of symmetrical diethylthiourea, anhydrous sodium sulfate, and yellow mercuric oxide in diethyl ether is stirred for 24 hours at room temperature. The brown, insoluble precipitate is removed by filtration. The cyanamide is added to the clear solution of diethylcarbodiimide, and while the reaction is being stirred the small amount of sodium methylate in methanol is added. The reaction mixture is stirred for 3 days at room temperature and the ether is evaporated. The crude 1,2-diethyl-3-cyanoguanidine is recovered and purified as described above, and has the same melting point.

EXAMPLE 2

1,2-dimethyl-3-cyanoguanidine

| Reagents | Molar Ratio |
| --- | --- |
| Lead cyanamide | 1.05 |
| s-Dimethylthiourea | 1.00 |
| Methanol | 31.20 |

The lead cyanamide and the methanolic solution of symmetrical dimethylthiourea are stirred at 65° C. until a clarified portion of the reaction mixture does not discolor when treated with a small amount of yellow mercuric oxide. The lead sulfide is removed by filtration and the 1,2-dimethyl-3-cyanoguanidine is recovered by evaporation of the methanol. After recrystallization from water, the pure material melts at 174.5°–174.8° C.

EXAMPLE 3

1,2-diphenyl-3-cyanoguanidine

A

| Reagents | Molar Ratio |
| --- | --- |
| Lead Cyanamide | 1.05 |
| s-Diphenylthiourea | 1.00 |
| Ethanol, absolute | 21.80 |

The lead cyanamide and a solution of symmetrical diphenylthiourea in absolute alcohol are stirred at refluxing temperature until a clarified portion of the solution shows no discoloration when treated with yellow mercuric oxide. The black lead sulfide is separated by filtration and the filtrate is chilled. 1,2-diphenyl-3-cyanoguanidine crystallizes from this solution. An additional amount of this material may be obtained by extracting the lead sulfide residue with the alcoholic mother liquor at elevated temperatures. When recrystallized from alcohol, the purified 1,2-diphenyl-3-cyanoguanidine melts at 195°–195.8° C.

B

| Reagents | Molar Ratio |
|---|---|
| s-Diphenylthiourea | 1.00 |
| Lead Cyanamide | 1.05 |
| Benzene | 12.80 |
| Lead cyanamide | 0.21 |

A mixture of symmetrical diphenylthiourea and lead cyanamide is heated in benzene on a steam bath for one hour. Another smaller portion of lead cyanamide is added and the heating is continued for an additional hour. The hot reaction mixture is filtered and the filtrate is chilled. 1,2-diphenyl-3-cyanoguanidine crystallizes from this solution and is isolated by filtration.

Substitution of acetone for the benzene in the above reaction produces 1,2-diphenyl-3-cyanoguanidine with essentially the same results. After purification, the material prepared according to the above procedures melts at the same temperature as that obtained in Example 3A.

C

| Reagents | Molar Ratio |
|---|---|
| Diphenylcarbodiimide | 1.0 |
| Benzene | 11.3 |
| Cyanamide | 2.0 |

The cyanamide is added to the benzene solution of diphenylcarbodiimide. This reaction mixture is stirred and heated at the refluxing temperature for 24 hours. During this reaction time 1,2-diphenyl-3-cyanoguanidine separates as a colorless crystalline solid. At the termination of the refluxing the reaction mixture is cooled and the aforementioned crystalline solid is recovered by filtration. The 1,2-diphenyl-3-cyanoguanidine is recrystallized from ethanol and its melting point is the same as that reported in Example 3A.

EXAMPLE 4

*1,2-di-o-tolyl-3-cyanoguanidine*

| Reagents | Molar Ratio |
|---|---|
| Lead cyanamide | 1.06 |
| s-Di-o-tolylthiourea | 1.00 |
| Ethanol, absolute | 25.60 |

The lead cyanamide and a solution of symmetrical di-o-tolylthiourea in absolute alcohol are stirred and refluxed until a clarified test portion of the solution shows no discoloration when treated with yellow mercuric oxide. The black lead sulfide is separated by filtration, and the 1,2-di-o-tolyl-3-cyanoguanidine is recovered by chilling the solution and filtering off the resulting crystals. An additional quantity of product may be obtained by extracting the lead sulfide cake with the alcoholic mother liquor at elevated temperatures. After recrystallization from alcohol, the pure 1,2-di-o-tolyl-3-cyanoguanidine melts at 210.5°–211° C.

EXAMPLE 5

*1-butyl-2-phenyl-3-cyanoguanidine*

| Reagents | Molar Ratio |
|---|---|
| Lead cyanamide | 0.98 |
| 1-Butyl-3-phenylthiourea | 1.00 |
| Ethanol | 34.40 |

The lead cyanamide and the alcoholic solution of the 1-butyl-3-phenylthiourea are mixed, stirred, and refluxed until a clarified test portion of the solution shows no discoloration after treatment with yellow mercuric oxide. The lead sulfide is filtered off and the 1-butyl-2-phenyl-3-cyanoguanidine is recovered by evaporation of the alcohol. After recrystallization from benzene, the product melts at 114°–115° C.

EXAMPLE 6

*1,2-dibutyl-3-cyanoguanidine*

A

| Reagents | Molar Ratio |
|---|---|
| Lead cyanamide | 1.1 |
| s-Dibutylthiourea | 1.0 |
| Ethanol | 25.6 |

The lead cyanamide and the alcoholic solution of symmetrical dibutylthiourea are mixed, stirred, and refluxed until a clarified test portion shows no discoloration when treated with yellow mercuric oxide. The lead sulfide is separated by filtration, and the crude 1,2-dibutyl-3-cyanoguanidine is recovered by evaporating the alcohol. After recrystallization from dilute methanol, the crystalline product melts at 63.5°–64.5° C.

B

| Reagents | Molar Ratio |
|---|---|
| Dibutylcarbodiimide | 1.00 |
| Ether, anhydrous | 27.10 |
| Cyanamide | 1.87 |
| Sodium metal | 0.082 |
| Ethanol | 2.05 |

The cyanamide and alcoholic sodium ethylate catalyst are added to the ethereal solution of dibutylcarbodiimide. This reaction mixture is stirred and heated at reflux in order to complete the reaction, and after completion thereof the mixture is cooled, filtered, and the filtrate evaporated to dryness. The crude 1,2-dibutyl-3-cyanoguanidine is recrystallized from dilute methanol, and its melting point is the same as that recorded in Example 6A.

EXAMPLE 7

*1-dodecyl-2-phenyl-3-cyanoguanidine*

| Reagents | Molar Ratio |
|---|---|
| Lead cyanamide | 1.05 |
| 1-Dodecyl-3-phenylthiourea | 1.00 |
| Ethanol | 43.00 |

The lead cyanamide and the alcoholic solution of 1-dodecyl-3-phenylthiourea are mixed, stirred, and refluxed until a clarified test portion shows no discoloration after treatment with yellow mercuric oxide. The warm reaction mixture is filtered to remove the lead sulfide and the 1-dodecyl-2-phenyl-3-cyanoguanidine is recovered by diluting the alcoholic filtrate with water. After recrystallization from hexane, the product melts at 77.5°–79° C.

EXAMPLE 8

*1,2-didodecyl-3-cyanoguanidine*

| Reagents | Molar Ratio |
|---|---|
| Lead cyanamide | 1.05 |
| s-Didodecylthiourea | 1.00 |
| Butanol | 33.80 |

The lead cyanamide and the butanol solution of symmetrical didodecylthiourea are mixed, stirred, and refluxed until a clarified portion shows no discoloration when treated with yellow mercuric oxide. After filtering off the lead oxide, the 1,2-didodecyl-3-cyanoguanidine is recovered by removing the butanol under reduced pressure. The product may be recrystallized from methyl alcohol.

While the invention has been described with particular reference to the specific embodiments, it is to be understood that it is not to be limited thereto but is to be construed broadly and restricted solely by the scope of the appended claims.

What is claimed:

1. As new compounds, the 1,2-dihydrocarbon-substituted-3-cyanoguanidines having at least one aliphatic hydrocarbon substituent.

2. 1,2-dialiphatic-hydrocarbon-substituted-3-cyanoguanidines.
3. 1,2-didodecyl-3-cyanoguanidine.
4. 1-butyl-2-phenyl-3-cyanoguanidine.
5. 1,2-dibutyl-3-cyanoguanidine.

HANS Z. LECHER.
ROBERT P. PARKER.
ROBERT S. LONG.

REFERENCES CITED

The following references are of record in the file of this patent:

UNITED STATES PATENTS

| Number | Name | Date |
|---|---|---|
| 2,289,541 | Ericks et al. | July 14, 1942 |
| 2,320,225 | Ericks | May 25, 1943 |
| 2,350,453 | Ericks | June 6, 1944 |

FOREIGN PATENTS

| Number | Country | Date |
|---|---|---|
| 542,812 | Great Britain | Jan. 28, 1942 |
| 116,563 | Germany | Nov. 20, 1900 |
| 506,962 | Germany | Sept. 10, 1930 |

OTHER REFERENCES

Walther et al., "J. Prakt. Chem.," vol. 92 (1915), p. 251.

Fromm, "Liebigs Annalen," vol. 361 (1908), p. 308.

Pellizari, "Gazz. Chim. Ital.," vol. 53 (1923), pp. 384–392.